United States Patent
Hsiao

(10) Patent No.: US 8,408,715 B2
(45) Date of Patent: Apr. 2, 2013

(54) PROJECTOR WITH SINGLE FAN

(75) Inventor: Chi-Hung Hsiao, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 290 days.

(21) Appl. No.: 12/838,408

(22) Filed: Jul. 16, 2010

(65) Prior Publication Data
US 2011/0013150 A1    Jan. 20, 2011

(30) Foreign Application Priority Data
Jul. 20, 2009  (TW) .............................. 98124456 A

(51) Int. Cl.
*G03B 21/18*  (2006.01)
*G03B 21/14*  (2006.01)

(52) U.S. Cl. ............... 353/61; 353/60; 353/57; 353/119

(58) Field of Classification Search .................... 353/61, 353/52, 60, 57, 119
See application file for complete search history.

(56) References Cited

U.S. PATENT DOCUMENTS
2004/0189954 A1  9/2004  Kuroda
2005/0162618 A1* 7/2005  Morita et al. .................... 353/57
2008/0174743 A1* 7/2008  Nakashita et al. ............... 353/57

FOREIGN PATENT DOCUMENTS
CN  1705909      12/2005
CN  1825201 A1    8/2006
CN  1928707 A     3/2007
TW  278918       10/2005

* cited by examiner

*Primary Examiner* — Georgia Y Epps
*Assistant Examiner* — Magda Cruz

(57) ABSTRACT

A projector with single fan including a casing, a heat source, a light source module and an axial-flow fan are provided. The casing has an air outlet and a first air inlet. The heat source, the light source module and the axial-flow fan are disposed in the casing. The light source module includes a lamp shade and a light-emitting part. The axial-flow fan is disposed in a light outgoing side of the light source module and has an airflow inlet and an airflow outlet. When the axial-flow fan is operating, a first airflow is generated. After flowing through the heat source, the first airflow enters the airflow inlet and generates a second airflow. The second airflow, blown out from the airflow outlet, dissipates the heat generated by the light source module and then flows out to the outside of the casing.

20 Claims, 3 Drawing Sheets

US 8,408,715 B2

PROJECTOR WITH SINGLE FAN

This application claims the benefit of Taiwan application Serial No. 98124456, filed Jul. 20, 2009, the subject matter of which is incorporated herein by reference.

BACKGROUND OF THE INVENTION

1. Field of the Invention

The invention relates in general to a projector with single fan, and more particularly to a projector with single fan with an axial-flow fan.

2. Description of the Related Art

In general, the projector mainly includes a casing body, an optical engine, a circuit unit, a light source and several cooling fans. Normally, the projector has more than one cooling fan, and the airflow is generated by the cooling fans and then flows to the light source, and the optical engine and the circuit unit further dissipates the heat generated by the light source, the optical engine and the circuit unit for marinating the normal operation of the projector.

However, the disposition of multiple cooling fans makes the interior space of the projector overcrowded, and further squeezes the disposition space for other elements. Also, the disposition of multiple cooling fans makes the cost of the projector hard to be lowered down.

SUMMARY OF THE INVENTION

The invention is directed to a projector with single fan which simultaneously dissipates the heat generated by the light source and other elements with only one axial-flow fan, not only reducing the cost of the projector with single fan but also increasing the flexibility in the design of the interior space of the projector with single fan.

According to a first aspect of the present invention, a projector with single fan is provided. The casing has an air outlet and a first air inlet. The heat source, the light source module and the axial-flow fan are disposed in the casing. The light source module includes a lamp shade and a light-emitting part. The axial-flow fan is disposed in a light outgoing side of the light source module and has an airflow inlet and an airflow outlet. When the axial-flow fan is operating, a first airflow is generated. After flowing through the heat source, the first airflow enters the airflow inlet and generates a second airflow. The second airflow, blown out from the airflow outlet, dissipates the heat generated by the light source module and then flows out to the outside of the casing. Thus, the axial-flow fan simultaneously dissipates the heat generated by the light source module and the heat source.

According to a second aspect of the present invention, a projector with single fan is provided. The projector with single fan includes a casing, a first heat source, a light source module, an axial-flow fan and a partition. The casing has an air outlet and a first air inlet. The first heat source is disposed in the casing. The light source module is disposed in the casing, and includes a lamp shade and a light-emitting part. The axial-flow fan is disposed in the casing, and has an airflow inlet and an airflow outlet. When the axial-flow fan is operating, a first airflow is generated. After flowing through the first heat source, the first airflow enters the airflow inlet and generates a second airflow in the airflow outlet. The second airflow dissipates the heat generated by the light source module and then flows out to the outside of the casing through the air outlet. The partition has a channel and divides the interior of the casing into a first region and a second region, wherein, the first heat source is located in the first region, and the light source module is located in the second region. The channel connects the first region and the second region, and the axial-flow fan is disposed in the channel.

The invention will become apparent from the following detailed description of the preferred but non-limiting embodiments. The following description is made with reference to the accompanying drawings.

DETAILED DESCRIPTION OF THE INVENTION

First Embodiment

Figure 1:
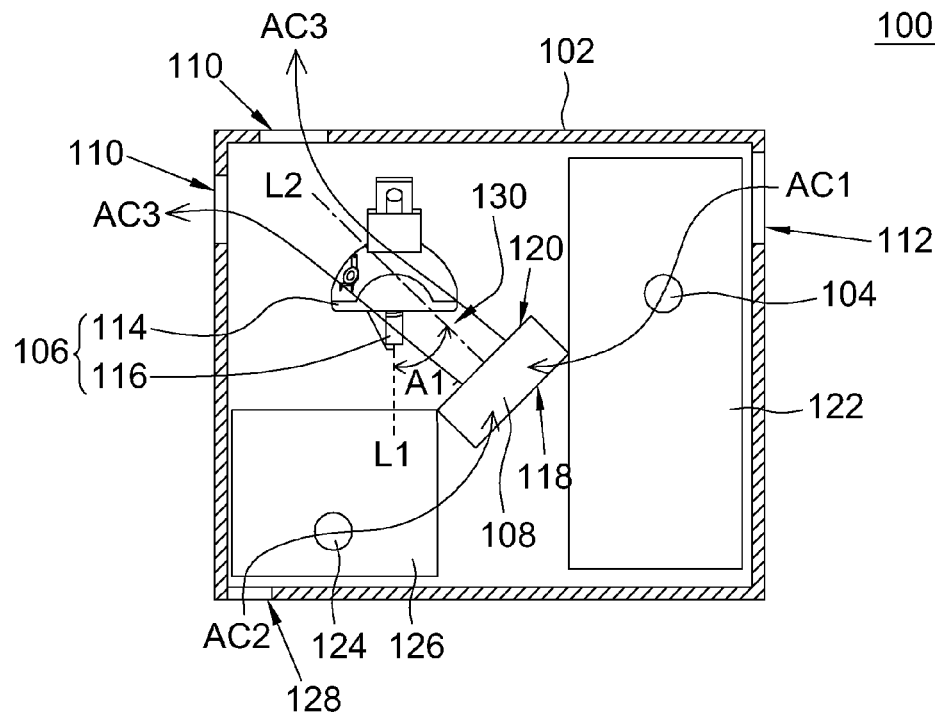
FIG. 1 shows a projector with single fan according to a first embodiment of the invention.

Referring to FIG. 1, a projector with single fan according to a first embodiment of the invention is shown. The projector with single fan 100 includes a casing 102, a first heat source 104, a second heat source 124, a light source module 106 and an axial-flow fan 108.

The casing 102 has several air outlets 110, a first air inlet 112 and a second air inlet 128.

The light source module 106 is disposed in the casing 102 and includes a lamp shade 114 and a light-emitting part 116. The light-emitting part 116 generates heat when emitting a light, and the lamp shade 114 is heated when reflecting the light generated by the light-emitting part 116. Thus, the temperature of the light source module 106 is normally higher than that of the first heat source 104 and the second heat source 124. In the present embodiment of the invention, the axial-flow fan 108 faces the light source module 106, and simultaneously dissipates the heat generated by the lamp shade 114 and the light-emitting part 116.

The first heat source 104 and the second heat source 124 are disposed in the casing 102. The first heat source 104 is generated by a circuit unit 122, and the second heat source 124 is generated by the optical engine 126.

The axial-flow fan 108 is disposed in a light outgoing side 130 of the light source module 106, and includes an airflow inlet 118 and an airflow outlet 120. An angle A1, such as an acute angle, is contained between the extension direction of L2 of the airflow outlet 120 and the center line L1 of the light source module 106.

When the axial-flow fan 108 is operating, airflow AC1 is generated between the airflow inlet 118 and the first air inlet 112, and airflow AC2 is generated between the airflow inlet 118 and the second air inlet 128. The first airflow AC1, after flowing through the first heat source 104 and dissipating the heat generated by the first heat source 104, enters the airflow inlet 118 and then generates airflow AC3 in the airflow outlet 120. The airflow AC3, after dissipating the heat generated by the lamp shade 114 and the light-emitting part 116 of the light source module 106, flows out to the outside of the casing 102 through the air outlet 110. The airflow AC2 dissipate the heat generated by the second heat source 124 and the light source module 106 in the same manner disclosed above and the dissipation process is not repeated here. Thus, the heat generated by the light source module 106 and the heat source (such as the optical engine 126 and the circuit unit 122) of the projector 100 with single fan 100 can be simultaneously dissipated using only one axial-flow fan 108.

Preferably but not limitedly, the first heat source 104 is located between the first air inlet 112 and the axial-flow fan 108, and the second heat source 124 is located between the second air inlet 128 and the axial-flow fan 108, so that the first airflow AC1 and the third airflow AC2 flow through the first heat source 104 and the second heat source 124 respectively during the course of flowing to the airflow inlet 118. The light source module 106 is located between the air outlet 110 and the axial-flow fan 108, so that the second airflow AC3 flows through the light source module 106 during the course of flowing to the air outlet 110.

In the present embodiment of the invention, the number of the heat source is exemplified by two. However, in other implementations, the axial-flow fan can dissipate the heat generated by more than two heat sources. Furthermore, by increasing the number of the airflow inlet or appropriately adjusting the existing location of the airflow inlet, the airflow flows through and dissipates the heat generated by the heat source that needs to be dissipated.

Second Embodiment

Figure 2:
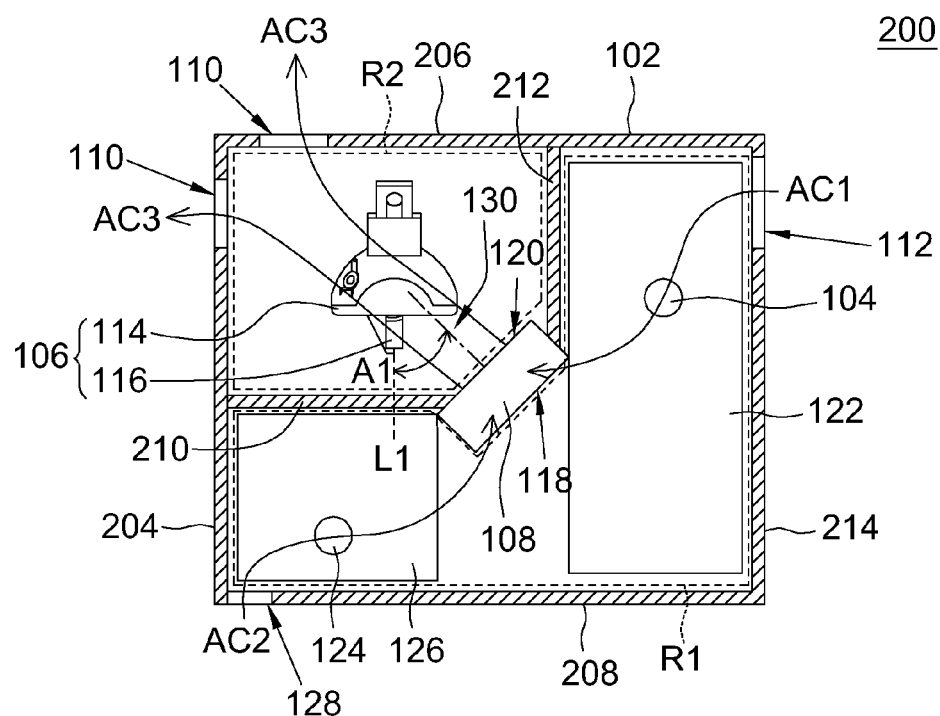
FIG. 2 shows a projector with single fan according to a second embodiment of the invention.

Referring to FIG. 2, a projector with single fan according to a second embodiment of the invention is shown. In second embodiment, the same reference numerals denote the same elements in first embodiment and the detailed descriptions on the same elements will be omitted hereinafter. The projector with single fan 200 of the second embodiment is different from the projector with single fan 100 of the first embodiment in that the projector with single fan 200 further includes a first partition 210 and a second partition 212.

The casing 102 includes a front portion 204, a rear portion 214 opposite to the front portion 204, a first side portion 206, and a second side portion 208 opposite to the first side portion 206. The first side portion 206 is connected to the front portion 204 and the rear portion 214, and the second side portion 208 is also connected to the front portion 204 and the rear portion 214. The first partition 210 and the second partition 212 are disposed in the casing 102. The two ends of the first partition 210 are connected to the front portion 204 and the axial-flow fan 108 respectively, and the two ends of the second partition 212 are connected to the first side portion 206 and the axial-flow fan 108 respectively. In greater details, the first partition 210, the second partition 212 and the axial-flow fan 108 together divide the interior of the casing 102 into a first region R1 and a second region R2 for separating the light source module 106 from the first heat source 104 and the second heat source 124. For example, the first heat source 104 and the second heat source 124 are located in the first region R1, and the light source module 106 is located in the second region R2.

Third Embodiment

Figure 3:
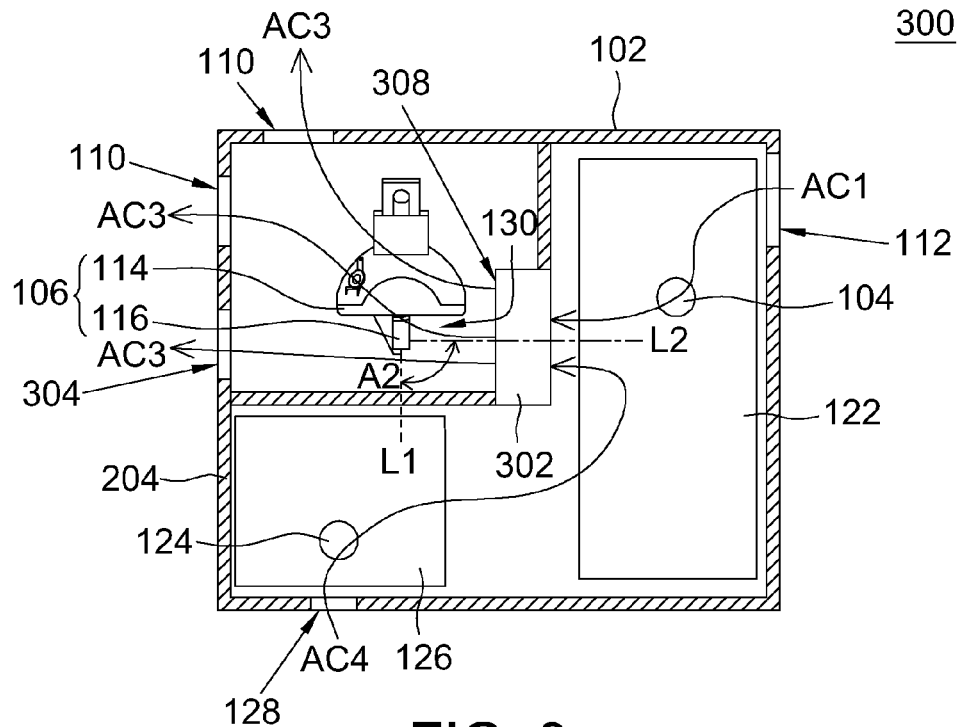
FIG. 3 shows a projector with single fan according to a third embodiment of the invention.

Referring to FIG. 3, a projector with single fan according to a third embodiment of the invention is shown. In third embodiment, the same reference numerals denote the same elements in second embodiment and the detailed descriptions on the same elements will be omitted hereinafter. The projector with single fan 300 of the third embodiment is different from the projector with single fan 200 of the second embodiment in that the axial-flow fan 302 of the projector with single fan 300 is substantially parallel to the center line L1 of the light source module 106. That is, the angle A2 contained between the extension direction of L2 of the airflow outlet 308 and the center line L1 of the light source module 106 is substantially 90 degrees.

When the axial-flow fan 108 of FIG. 2 is relocated to a new position indicated in FIG. 3, the flowing path of the second airflow AC3 of FIG. 2 changes accordingly. However, an air outlet 304 can be disposed at the front portion 204 of the casing 102. Through the air outlet 304 and the flowing path of the second airflow AC3, the heat generated inside the projector with single fan 300 is smoothly dissipated. The air outlet can be added freely and the position of the air outlet can be adjusted to increase the dissipation effect.

In addition, after the axial-flow fan 108 of FIG. 2 is relocated to a new position indicated in FIG. 3, the flowing path of the third airflow AC2 of FIG. 2 no more passes through the second heat source 124. As long as the second air inlet 128 of FIG. 2 is relocated to a new position indicated in FIG. 3, the third airflow AC4 of FIG. 3 still can flow through the second heat source 124 for dissipating the heat generated by the second heat source 124.

As disclosed in the second embodiment and the third embodiment, the axial-flow fan, the first air inlet, the second air inlet and the air outlet can be disposed in many different manners, and are not limited to the disclosure in the second embodiment and the third embodiment.

Fourth Embodiment

Figure 4:
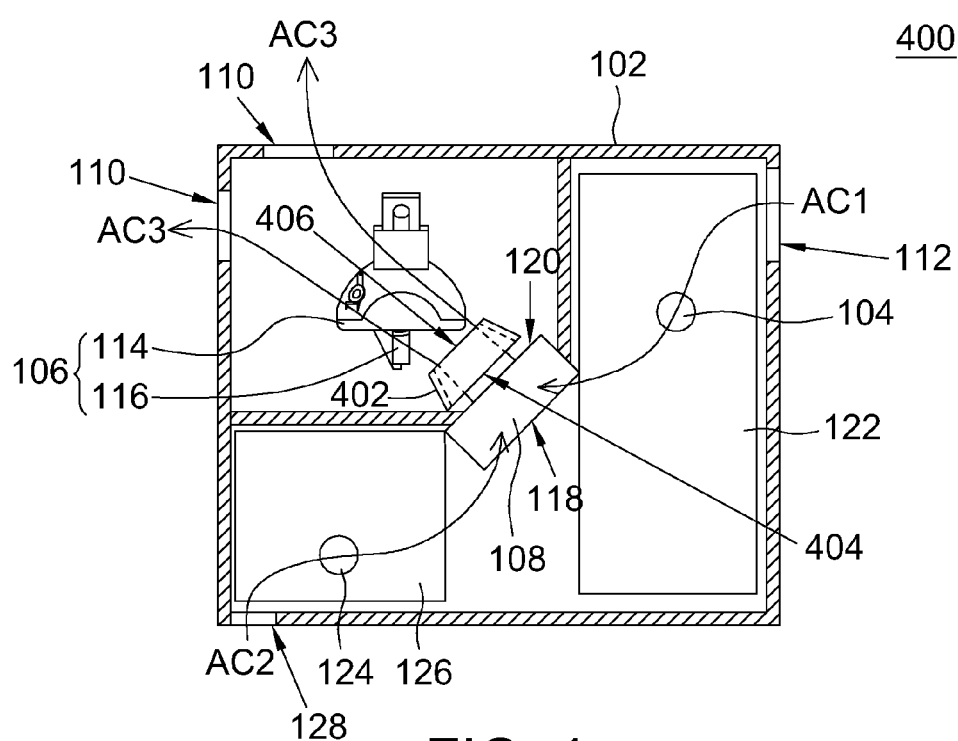
FIG. 4 shows a projector with single fan according to a fourth embodiment of the invention.

Referring to FIG. 4, a projector with single fan according to a fourth embodiment of the invention is shown. In fourth embodiment, the same reference numerals denote the same elements in second embodiment and the detailed descriptions on the same elements will be omitted hereinafter. The projector with single fan 400 of the fourth embodiment is different from the projector with single fan 200 of the second embodiment in that the projector with single fan 400 further includes an air duct 402.

The air duct 402 is disposed in the casing 102 and has a first opening 404 and a second opening 406 opposite to the first opening 404. The area of the first opening 404 is larger than that of the second opening 406, wherein the first opening 404 is adjacent to the airflow outlet 120, and the second opening 406 is adjacent to and towards the light source module 106. Thus, the second airflow AC3 may flow out from the second opening 406 at higher speed for increasing the dissipation effect of the light source module 106.

In the present embodiment of the invention, the air duct 402 is disposed in the casing 102. However, the air duct 402 can also be disposed on the axial-flow fan 108, and is not limited to the exemplification in the present embodiment of the invention.

Fifth Embodiment

Figure 5:
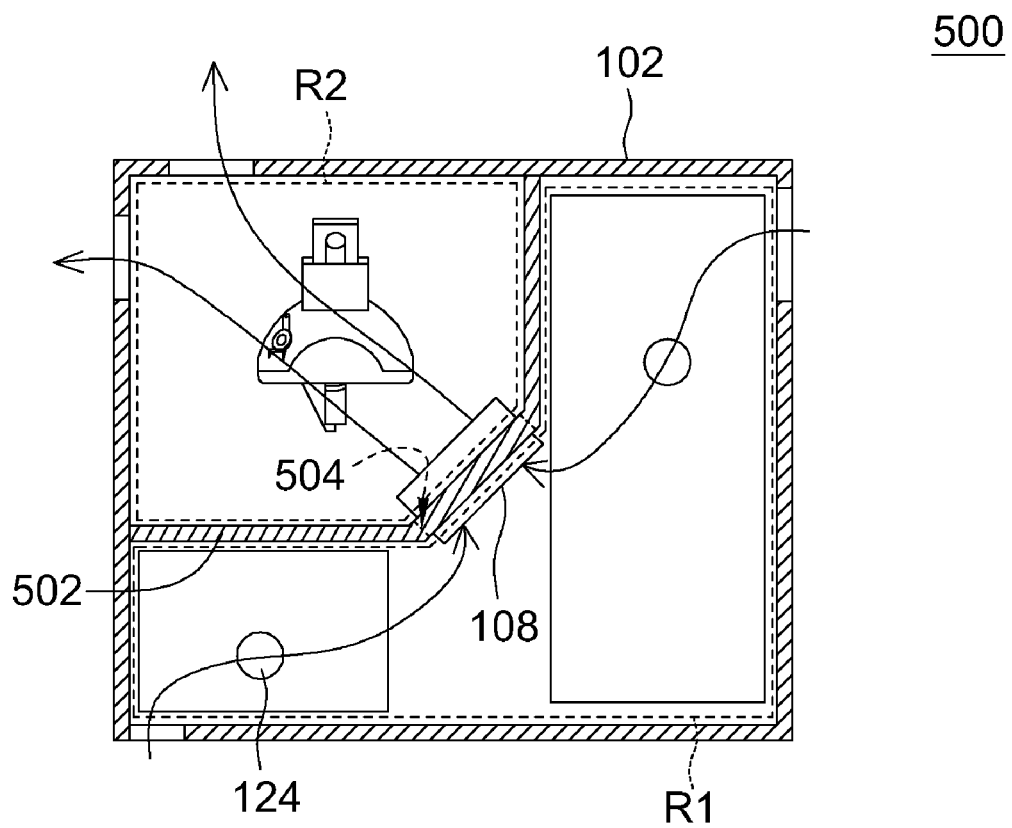
FIG. 5 shows a projector with single fan according to a fifth embodiment of the invention.

Referring to FIG. 5, a projector with single fan according to a fifth embodiment of the invention is shown. In fifth embodiment, the same reference numerals denote the same elements in second embodiment and the detailed descriptions on the same elements will be omitted hereinafter. The projector with single fan 500 of the fifth embodiment is different from the projector with single fan 200 of the second embodiment in that the partition 502 of the projector with single fan 500 can be an integrally formed partition.

The partition 502 has a channel 504. The channel 504 connects the first region R1 and the second region R2. The axial-flow fan 108 is disposed in the channel 504. That is, the partition 502 divides the interior of the casing 102 into a first region R1 and a second region R2.

The projector with single fan disclosed in the above embodiments of the invention has many advantages exemplified below:

(1). Through the design of relative positions of the axial-flow fan, the first air inlet, the second air inlet and the air outlet, the projector with single fan can dissipate the heat generated by the light source module and the heat source (such as the optical engine and the circuit unit), which are disposed inside the projector with single fan, with only one single axial-flow fan, not only reducing the cost of the projector with single fan but also increasing the flexibility in the design of the interior space of the projector with single fan.

(2). The projector with single fan can have a partition disposed therein to prevent the second airflow carrying the heat generated by the light source module from being sucked to the airflow inlet of the axial-flow fan so that the heat generated by the light source module will not circulate inside the projector with single fan. Thus, the disposition of the partition may increases the dissipation effect of the light source module.

(3). The projector with single fan can have an air duct disposed therein so that the second airflow may flow to the light source module at higher speed and the dissipation effect of the light source module is increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector with single fan, comprising:
   a casing having an air outlet and a first air inlet;
   a first heat source disposed in the casing;
   a light source module disposed in the casing, wherein the light source module comprises a lamp shade and a light-emitting part; and
   only an axial-flow fan disposed in a light outgoing side of the light source module, wherein the axial-flow fan has an airflow inlet and an airflow outlet facing the light outgoing side of the light source module, a first airflow is generated when the axial-flow fan is operating, the first airflow, after flowing through the first heat source, enters the airflow inlet and generates a second airflow in the airflow outlet, and the second airflow dissipates the heat generated by the light source module and then flows out to the outside of the casing through the air outlet.

2. The projector with single fan according to claim 1, wherein the first heat source is located between the first air inlet and the axial-flow fan, and the light source module is located between the air outlet and the axial-flow fan.

3. The projector with single fan according to claim 1, wherein the temperature of the light source module is higher than that of the first heat source.

4. The projector with single fan according to claim 1, further comprising:
   an air duct disposed in the casing, wherein the air duct further has a first opening and a second opening, the area of the first opening is larger than that of the second opening, the first opening is adjacent to the airflow outlet, and the second opening is adjacent to and towards the light source module.

5. The projector with single fan according to claim 1, wherein the light source module defines a center line, and the axial-flow fan is substantially parallel to the center line.

6. The projector with single fan according to claim 1, wherein the light source module defines a center line, and an angle is contained between the extension direction of the airflow outlet and the center line.

7. The projector with single fan according to claim 1, further comprising:
   a partition disposed in the casing, wherein the partition and the axial-flow fan separate the light source module from the first heat source.

8. A projector with single fan, comprising:
   a casing having an air outlet and a first air inlet;
   a first heat source disposed in the casing;
   a light source module disposed in the casing, wherein the light source module comprises a lamp shade and a light-emitting part; and
   only an axial-flow fan disposed in the casing, wherein the axial-flow fan has an airflow inlet and an airflow outlet, a first airflow is generated when the axial-flow fan is operating, the first airflow, after flowing through the first heat source, enters the airflow inlet and generates a second airflow in the airflow outlet, and the second airflow dissipates the heat generated by the light source module and then flows out to the outside of the casing through the air outlet;
   a partition having a channel, wherein the partition separates the interior of the casing into a first region and a second region, the first heat source is located in the first region, the light source module is located in the second region, the channel connects the first region and the second region, and the axial-flow fan is disposed in the channel.

9. The projector with single fan according to claim 8, wherein the casing comprises a front portion, a first side portion and a second side portion, the first side portion and the second side portion are opposite to each other and connected to the front portion, the partition comprises a first partition and a second partition, the two ends of the first partition are connected to the front portion and the axial-flow fan respectively, and the two ends of the second partition are connected to the first side portion and the axial-flow fan respectively.

10. The projector with single fan according to claim 8, wherein the light source module defines a center line, and the axial-flow fan is disposed in a light outgoing side of the light source module and substantially parallel to the center line.

11. The projector with single fan according to claim 8, wherein the light source module defines a center line, the axial-flow fan is disposed in a light outgoing side of the light source module, and an angle is contained between the extension direction of the airflow outlet and the center line.

12. The projector with single fan according to claim 8, wherein the first heat source is located between the first air inlet and the axial-flow fan, and the light source module is located between the air outlet and the axial-flow fan.

13. The projector with single fan according to claim 8, wherein the temperature of the light source module is higher than that of the first heat source.

14. The projector with single fan according to claim 8, wherein the casing has a second air inlet, and the projector further comprises:
   a circuit unit, wherein the first heat source is generated by the circuit unit; and
   a optical engine having a second heat source located between the second air inlet and the axial-flow fan, wherein a third airflow is generated between the airflow inlet and the second air inlet when the axial-flow fan is operating, the third airflow, after flowing through the second heat source, enters the airflow inlet and then generates the second airflow in the airflow outlet, and the second airflow dissipates the heat generated by the light source module and then flows out to the outside of the casing through the air outlet.

15. The projector with single fan according to claim 8, further comprising:

an air duct disposed in the casing, wherein the air duct further has a first opening and a second opening, the area of the first opening is larger than that of the second opening, the first opening is adjacent to the airflow outlet, and the second opening is adjacent to and towards the light source module.

16. A projector with single fan, comprising:

a casing having an air outlet and a first air inlet;

a first heat source disposed in the casing;

a light source module disposed in the casing, wherein the light source module comprises a lamp shade and a light-emitting part; and only an axial-flow fan disposed in a light outgoing side of the light source module, wherein the axial-flow fan has an airflow inlet and an airflow outlet, a first airflow is generated when the axial-flow fan is operating, the first airflow, after flowing through the first heat source, enters the airflow inlet and generates a second airflow in the airflow outlet, and the second airflow dissipates the heat generated by the light source module and then flows out to the outside of the casing through the air outlet;

wherein the casing has a second air inlet, and the projector with single fan further comprising:

a circuit unit, wherein the first heat source is generated by the circuit unit; and;

an optical engine having a second heat source located between the second air inlet and the axial-flow fan, wherein when the axial-flow fan is operating, a third airflow is generated between the airflow inlet and the second air inlet, the third airflow, after flowing through the second heat source, enters the airflow inlet and then generates the second airflow in the airflow outlet, and the second airflow dissipates the heat generated by the light source module and then flows out to the outside of the casing through the air outlet.

17. The projector with single fan according to claim 16, further comprising:

an air duct disposed in the casing, wherein the air duct further has a first opening and a second opening, the area of the first opening is larger than that of the second opening, the first opening is adjacent to the airflow outlet, and the second opening is adjacent to and towards the light source module.

18. The projector with single fan according to claim 16, wherein the light source module defines a center line, and the axial-flow fan is substantially parallel to the center line.

19. The projector with single fan according to claim 16, wherein the light source module defines a center line, and an angle is contained between the extension direction of the airflow outlet and the center line.

20. The projector with single fan according to claim 16, further comprising:

a partition disposed in the casing, wherein the partition and the axial-flow fan separate the light source module from the first heat source.

* * * * *